(12) United States Patent
Liu

(10) Patent No.: US 7,926,968 B2
(45) Date of Patent: Apr. 19, 2011

(54) DUAL MODE LUMINOUS BALL PEN

(75) Inventor: Yu-Yin Liu, Taipei (TW)

(73) Assignee: Spark Gold Co., Taipei (TW)

( * ) Notice: Subject to any disclaimer, the term of this patent is extended or adjusted under 35 U.S.C. 154(b) by 630 days.

(21) Appl. No.: 12/025,822

(22) Filed: Feb. 5, 2008

(65) Prior Publication Data
US 2009/0196021 A1 Aug. 6, 2009

(51) Int. Cl.
*B43K 29/10* (2006.01)
(52) U.S. Cl. .................. 362/118; 362/109; 362/800
(58) Field of Classification Search .............. 362/118, 362/109, 800; 401/195
See application file for complete search history.

(56) References Cited

U.S. PATENT DOCUMENTS

| | | | | |
|---|---|---|---|---|
| 4,677,428 A | * | 6/1987 | Bartholow | 345/180 |
| 7,241,022 B2 | * | 7/2007 | Lin | 362/118 |
| 7,393,114 B2 | * | 7/2008 | Devlin | 362/109 |
| 7,419,275 B2 | * | 9/2008 | Huang | 362/118 |
| 2004/0161288 A1 | * | 8/2004 | Tsai | 401/195 |

* cited by examiner

*Primary Examiner* — Jong-Suk (James) Lee
*Assistant Examiner* — Mark Tsidulko

(57) ABSTRACT

A dual mode luminous ball pen is disclosed. The luminous pen includes a pen shaft; a tapered transparent tip portion disposed on a proximal end of the shaft; a refill, a switch portion, a lamp, a control portion, and a button. The switch portion disposed inside the pen shaft and connected to the tip portion for rotating a sleeve. The lamp includes at least a cell, a first light emitting diode (LED), and a second LED, and can be rotated together by the sleeve to supply/cut-off a power supplied by the cell to the LEDs. The control portion is disposed on the switch portion to turn on one of the first and second LEDs. The button is depressed into the pen shaft to rotate the control portion.

16 Claims, 11 Drawing Sheets

DUAL MODE LUMINOUS BALL PEN

BACKGROUND OF THE INVENTION

1. Field of the Invention

The present invention is related to a luminous pen with a pair of light emitting diodes under dual mode control.

2. Description of Related Art

We are already familiar with Luminous ball pen, and a variety of patented luminous pens are described in domestic and foreign patent documents. In summary, light emitting diode (LED) is disposed on a top end of the pen shaft emits light for illuminating surrounding environment or for making the pen look interesting and attractive. LED disposed may be disposed near a pen tip portion such it emits light while writing so that when writing in the dark, the surrounding environment is illuminated. Alternatively, the LED may be disposed at a middle portion of the pen shaft to emit light for illuminating the trademark or patterns formed thereon.

Most LEDs switches on or off by pressing buttons on the top end of pen shaft, or LEDs may be turned on or off by rotating upper or lower portion of the pen shaft relative to each other; or being depressed inward of the pen shaft, where a button or key is normally bulged out, to determine whether LED is lit up or not.

Conventional luminous ball pen has some of the following drawbacks.

1. Press button on top of the pen shaft usually must be pressed downward several times to activate LED. For example, to light up LED once, the press button must be pressed downward, at least three times in order to light up LED and vice versa, impel pen nib from a retract position to a written position and vice versa. When two LEDs are disposed in a pen shaft, the press button must be pressed six times to determine light/dim modes of two LEDs, and retract/written positions of pen nib. In other words, one LED may be lit up one time, as the press button is pressed into the top end of pen shaft up to six times. Therefore, how to reduce the number of pressing times of a button is an important issue for improving the convenience of usage of the luminous pen.

2. When a luminous ball pen is not in use, users may unintentionally touch the press button, or rotate the upper or lower shaft, or click the key bulged out from the shaft. As a result, LEDs are being continuously turned on and consume power. Therefore, how to prevent such unintentional turning on of the LEDs is another important issue prevent unnecessary wastage of power.

3. Dual mode luminous ball pen may provide a first LED on top of the pen shaft to illuminate surrounding environment, but no projected images can be presented by the first LED. Therefore, how to increase a projected image function of the first LED is yet another important issue to improve the esthetic appearance of the luminous pen.

SUMMARY OF THE INVENTION

The present invention provides a dual mode luminous ball pen comprising a pen shaft (1); a tapered transparent tip portion (2); a refill (3); a switch portion (4); a lamp (5); a control portion (6) and a button (7). The tip portion (2) is disposed on a proximal end of the shaft (1), and can be operatively rotated. The refill (3) may be operatively slided along with a nib to and fro through the tip portion(2) to retain a writing position or a retracted position. The switch portion (4) is disposed inside the pen shaft (1) and connected to the tip portion (2) to rotate a sleeve (40). The lamp (5) has at least a cell (9), a first LED (55a), and a second LED (55b). The lamp (5) may be turned on/off by rotating the sleeve (40) and the cell supplies power to the LEDs (55a,55b). The control portion (6) is disposed on the switch portion (4) for controlling the on/off states of the first or second LEDs (55a,55b). A button (7) may be depressed into the pen shaft (1) to rotate the control portion (6).

The switch portion (4) comprises the sleeve (40) coupled to the tip portion (2). A rotation restricting stop (41) is employed to restrict a rotation angle of the sleeve (40). The lamp (5) comprises a first base (50) and a second base (52), wherein the first LED (55a) is disposed on the first base (50) and the second LED (55b) is disposed on the second base (52), and the second base (52) can be simultaneously rotated with the sleeve (40). The second base (52) comprises a conduit bushing(53) coupled to the sleeve (40), a hub (54) fitted in the conduit bushing (53) by a lower-half portion, wherein an upper-half portion of the hub (54) comprises the cell(9) mounted therein is fit through the first base (50). The lower-half portion of the hub (54) comprises the LED (55b) mounted therein. The rotation restricting stop (41) is coupled to the first base (50). A first lead (503) and a second lead (504) are disposed on both sides of the first base (50) respectively. The first legs (551 and 553) of the first and second LEDs (55a,55b) are connected to an anode, a cathode of the cell (9) respectively.

At least, a conductor (611) is disposed below the control portion (6). When the control portion (6) is rotated, the conductor (611) is connected to distal ends of the first lead (503) and the first leg (551); or connected to distal ends of the second lead (504) and the second leg (552). Thus, one of the LEDs (55a,55b) is activated and turned on.

According to an aspect of the present invention, the tapered transparent tip portion (2) can be rotated to turn on/off the lamp (5). In addition, the button (7) can be pressed to control the on/off state of the LEDs (55a,55b). For example, both LEDs (55a,55b) can be lit up when the button (7) is pressed to two times. In contrast, in the conventional luminous pen, the button must be pressed six times to turn on one of the LEDs.

According to another aspect of the present invention, the tapered transparent tip portion (2) may be rotated to switch the power on/off to turn on/off the lamp (5). When the lamp (5) is turned off, regardless of how many times the button is pressed, the LEDs (55a,55b) will not be turned on or even when users accidentally touch the button, the LEDs (55a,55b) will not be turned on and thus the unnecessary power consumption may be effectively avoided.

According to an aspect of the present invention, the first and second lens (71a and 71b) and the slide (8) are disposed inside the button (7), and when the light from the first LED (55a) passes through the lens (71a,71b) to the slide (8), the patterns on the slide (8) is magnified and projected on the objects proportional to a distant from the lens relative to the slide to the LED. Conversely, when the slide (8) is not disposed inside the button (7), surrounding environment is directly illuminated by the light concentrated by the lens (71a and 71b). The button is designed for both illumination and projection purposes.

DETAILED DESCRIPTION OF THE PREFERRED EMBODMIENTS OF THE INVENTION

Figure 1:
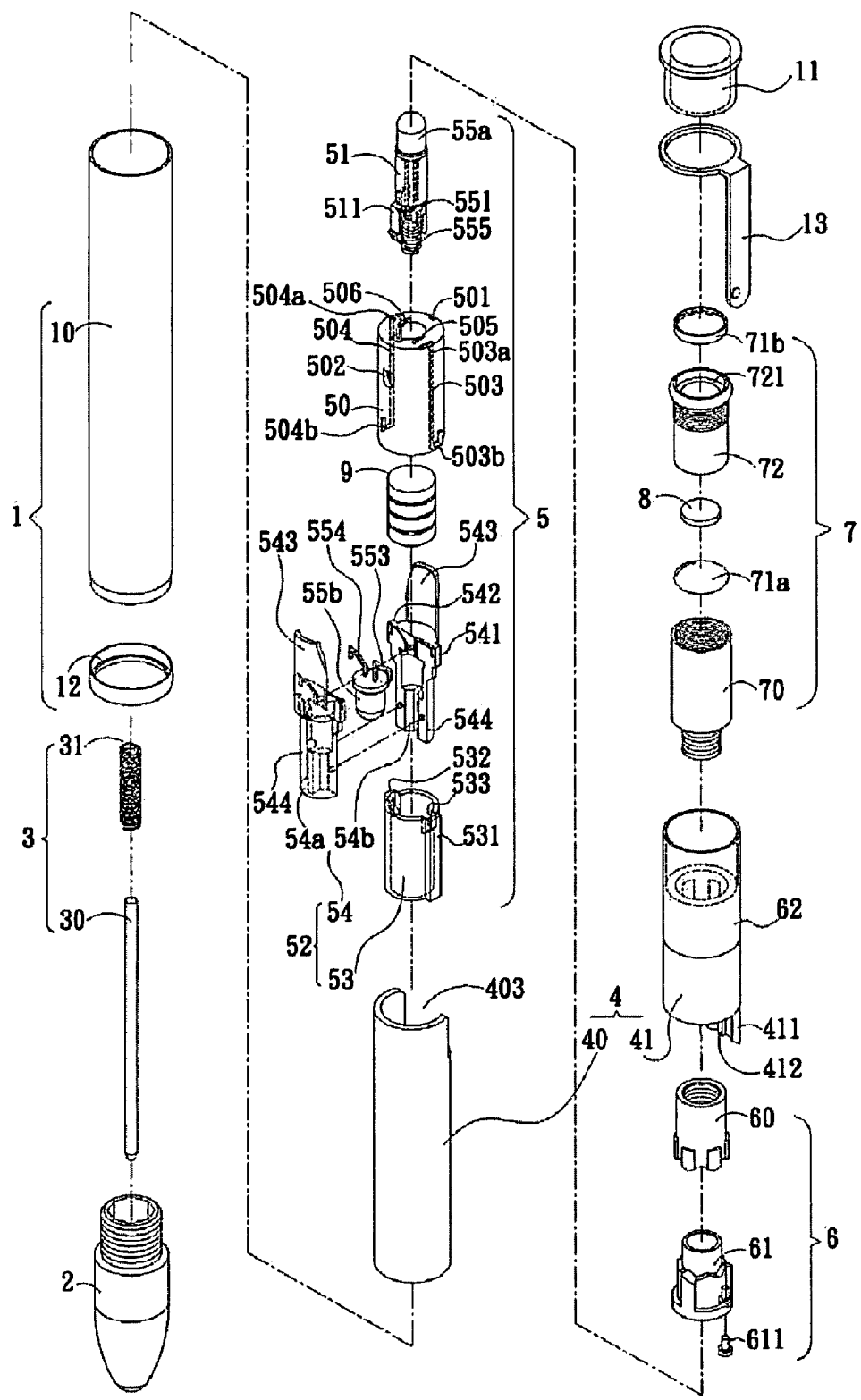
FIG. 1 is an exploded view of a luminous pen according to the invention.

The description is described in detail according to the appended drawings hereinafter.

As shown in FIGS. 1~4, a dual mode luminous pen includes a shaft 1, a tapered transparent tip portion 2, a refill 3, a switch portion 4, a lamp 5 having at least a cell 9, a control portion 6, and a button 7.

The shaft 1 is a hollow tube. The tip portion 2 is disposed to a proximal end of the shaft 1. The tip portion 2 is made of, for example, acrylic or the like, which is pervious to light. Rather, the tip portion 2 can be rotated by hand by manual operation. The refill 3 is configured by a specific refill 30 urged by an expansion spring 31 to retract or advance the refill 30 in use through the tip portion 2 where a nib of the refill is retracted into the tip portion in a retracted position, or advanced forward out of the tip portion in a written position. Ink contained in the refill 30 flows to nib for a writing purpose. The switch portion 4 is disposed inside the shaft 1 is connected to the tip portion 2. The switch portion 4 has a sleeve 40, which is rotated simultaneously with the tip portion 2. The lamp 5 includes the cell 9, a first light emitting diode (LED) 55a, and a second LED 55b. The sleeve 40 is rotated to supply/cut power from the cell 9 to the lamp 5. The control portion 6 disposed on the switch portion 4 controls to turn on either the first LED 55a or the second LED 55b. A button 7 disposed on a distal end of the shaft 1 is pressed downward to impel the control portion 6 to be rotated with a pitch and a roll angle.

Figure 2:
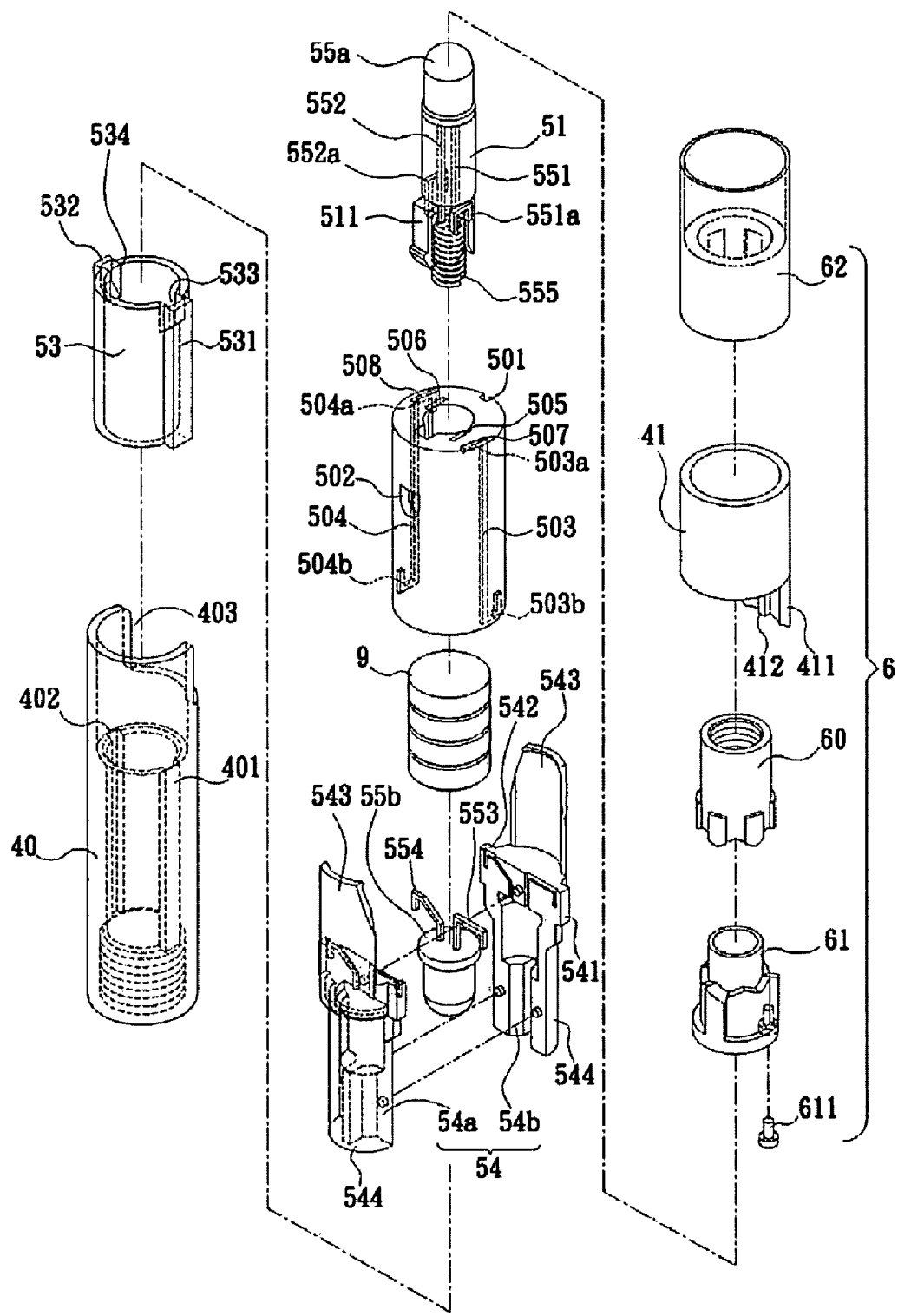
FIG. 2 is an exploded view showing a switch, a lamp, and a control of the luminous pen according to the invention.

The switch portion 40 is composed of the sleeve 40 coupled to the tip portion 2; and a rotation restricting stop 41 applied to restrict a pitch and roll angle of the sleeve 40. The lamp 5 is composed of a first base 50 equipped with the first LED 55a, and a second base 52 equipped with the second LED 55b can be rotated simultaneously with the sleeve 40. The second base 52 is composed of a conduit bushing 53 coupled to the sleeve 40, and a lower-half portion of a hub 54 fit in the conduit bushing 53, while the cell 9 is mounted inside an upper-half portion of the hub 54 fit into the first base 50. But the second LED 55b is mounted inside the lower-half portion of the hub 54. The rotation restricting stop 41 is coupled to the first base 50 inside the shaft 1 without any rotations. As shown in FIG. 2, a first and a second metal leads 503 and 504 are disposed to both sides of the first base 50 respectively, while first legs 551 and 553 of the first, second LEDs 55a and 55b are connected to a cathode and an anode of the cell 9 respectively. A t least a conductor 611 is disposed below the control portion 6, where a distal end 503A of said first lead 503 is in contact with said first leg 551 of the first LED 55a, or a distal end 504a of said second lead 504 is in contact with said second leg 552 of the first Led 55a. As a result, one of the LEDs 55a and 55b can be turned on to be illuminated. More details shall be described hereinafter.

The shaft 1 is composed of an open end tube 10 of the hollow shaft 1, a first snap ring 11 and a shift knob 13 as a pen clip are disposed to a distal end of the tube 10 to secure the button 7 to the tube 10, and a second snap ring 12 disposed to a proximal end of the tube 10. The second snap ring 12 is screwed to the shaft 1, or mounted onto, or pressed in the shaft 1 integrally as a whole. When the tip portion 2 is removed, the second base 52 can be taken away from the switch portion 4, where the cell 9 can be replaced promptly.

As shown in FIG. 2, the first base 50 is coupled to the rotation restricting stop 41 without any rotations, the first, second leads 503 and 504 are led into both sides of the first base 50. Distal ends 503a and 504a of the leads 503 and 504 are exposed outward from an upper surface at a distal end of the first base 50.

Figure 13:
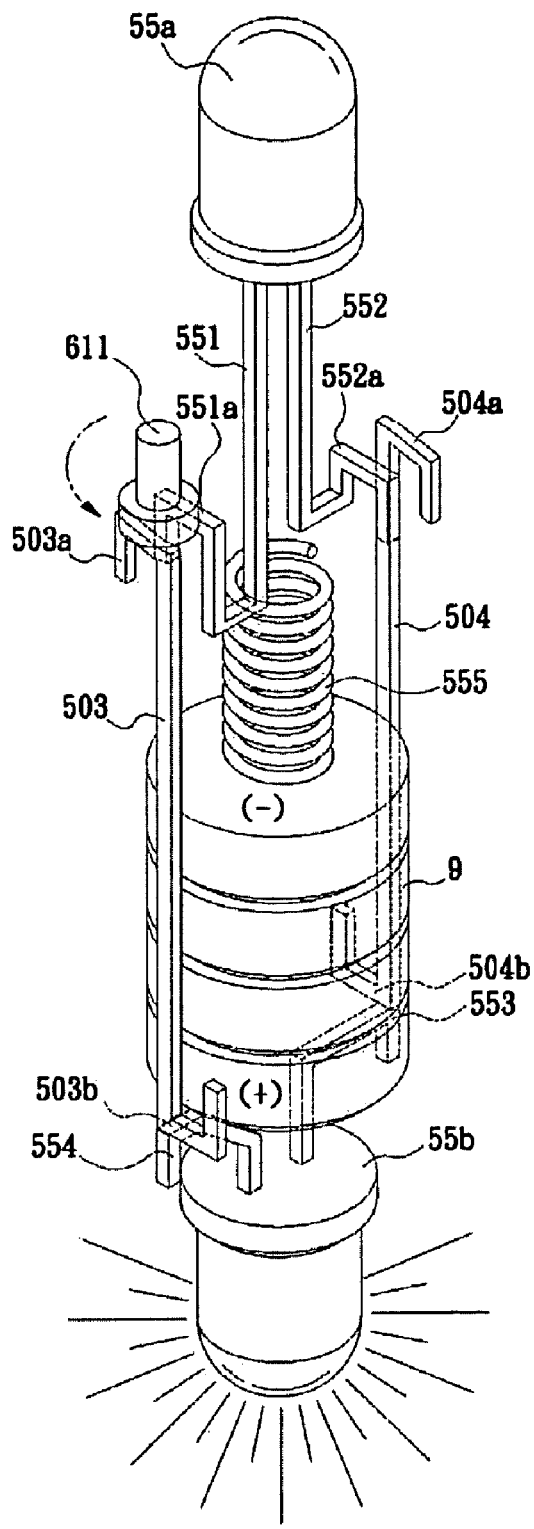
FIG. 13 is a perspective view of the luminous pen shown FIG. 11.
Figure 14:
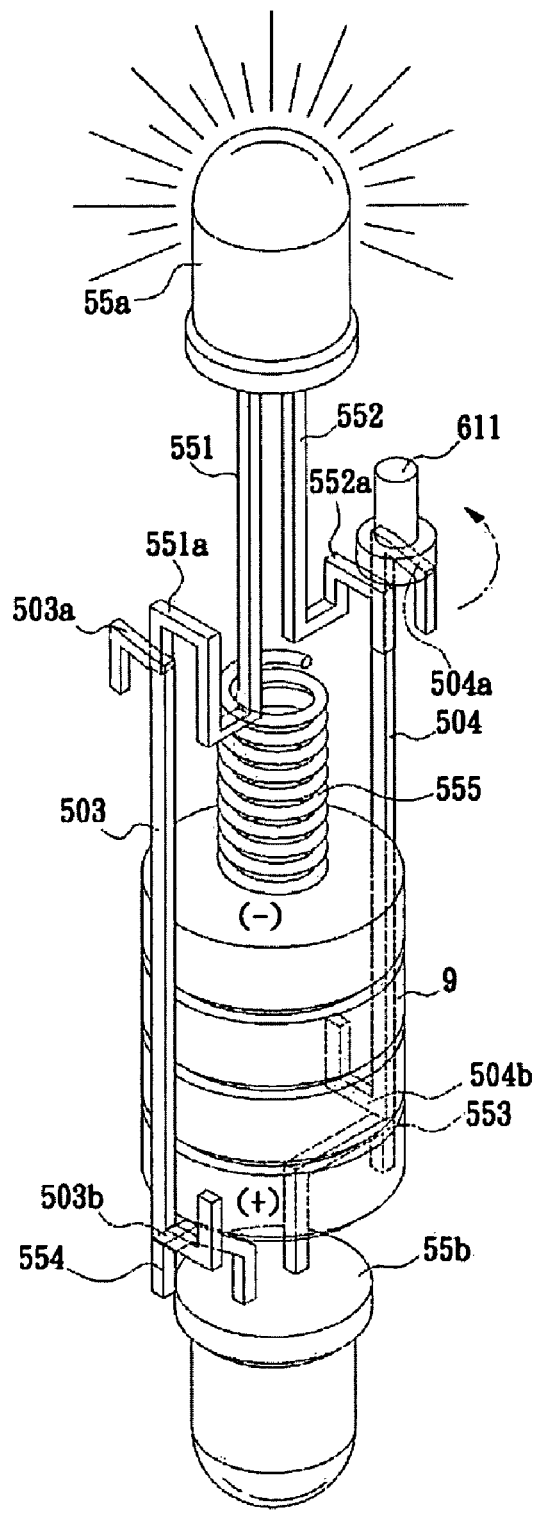
FIG. 14 is a perspective view of the luminous pen shown in FIG. 12.

The first LED 55a is disposed on a tappet 51 at a distal end, opposite to the LED 55a, an elastic hook 511 is hung from a proximal end of the tappet 51. The elastic hook 511 press-fits through the upper surface of the first base 50 and sticks out from an opening 502 formed on a wall of the first base 50 with a curved tip of the elastic hook 511. The first, second legs 551 and 552 of the first LED 55a is extended through the tappet 51 from up to down, a distal end 551a of the first leg 551, which can be spanned across by a spring force conductor 555, is able in contact with a cathode of the cell 9 (as shown in FIGS. 13~14), but a distal end 552a of the second leg 552 is out of contact with a spring force conductor 555. Distal ends 551a and 552a of the legs 551 and 552 press-fit in slots 505 and 506 formed on the upper surface at the distal end of the first LED 50. Bayonet bent distal ends 503a and 504a of the leads 503 and 504 press-fit in slots 507 and 508 formed on the upper surface at the distal end of the first base 50. As shown in FIG. 2, the slots are equidistantly arranged on the upper surface at the distal end of the first base 50, whereby a gap between the slot 505 and the slot 507 is identical to a gap between the slot 506 and the slot 508. Thereby, the distal ends 551a and 552a of the legs 551 and 552 of the first LED 55a are arranged in parallel, both of them are not in contact with the distal ends 503a and 504a of the leads 503 and 504, but distant from the same at the fixed gap.

The spring force conductor 555 can be selected from one of the following: a metal elastic member (such as spring), a metal lead, or an elongated portion of the first leg 551 of the first LED 55a; the spring force conductor 555 is not restricted to the spring as shown in drawings.

The second LED 55b is upside down disposed inside a beam pipe 544 formed along an inner wall of the hub 54, which press-fits into the conduit bushing 53 to form the second base 52. A first, second legs 553 and 554 of the second LED 55b are extended outward with bayonet bend distal ends, which can be rotated to adjoin to or separate from both proximal ends 503b and 504b of the leads 503 and 504 for an electrification provided to the second LED 55b or not, that can be further understood from FIGS. 7~8 and related description hereinafter.

An inner wall of the sleeve 40 is lengthwise symmetrically formed with a first slot 401, and a second slot 402 opposite to each other. The conduit bushing 53 is concentrically disposed inside the sleeve 40. On an outer wall of the conduit bushing 53 are lengthwise bulged out with a first, a second slips 531 and 532 relative to the slots 401 and 402. As the slips 531 and 532 press-fit in the slots 401 and 402; the conduit bushing 53 can be rotated with the sleeve 40 simultaneously.

The hub 54 is symmetrically composed of two shells 54a and 54b opposite to each other. Each of the shell 54a and 54b is divided into an upper-half portion and a lower-half portion. The upper-half portion is formed with a cavity of a diameter larger than the lower-half portion for receiving the cell 9 to form a holder 543. The lower-half portion is concaved downward with diameter smaller than the upper-half portion for receiving the second LED 55b and the set of refills 3 to form the beam pipe 544 to press-fit in the rotation restricting stop 53. Edges of upper rim of the beam pipe 544 are bulged out with two slides 541 and 542 opposite to each other in symmetry. Both slides 541 and 542 press-fit in slots 533 and 534 lengthwise formed inside a top rim of the rotation restricting stop 53 in position. Thereby, as the sleeve 40 is rotated, the conduit bushing 53 and the hub 54 are rotated simultaneously.

Figure 3:
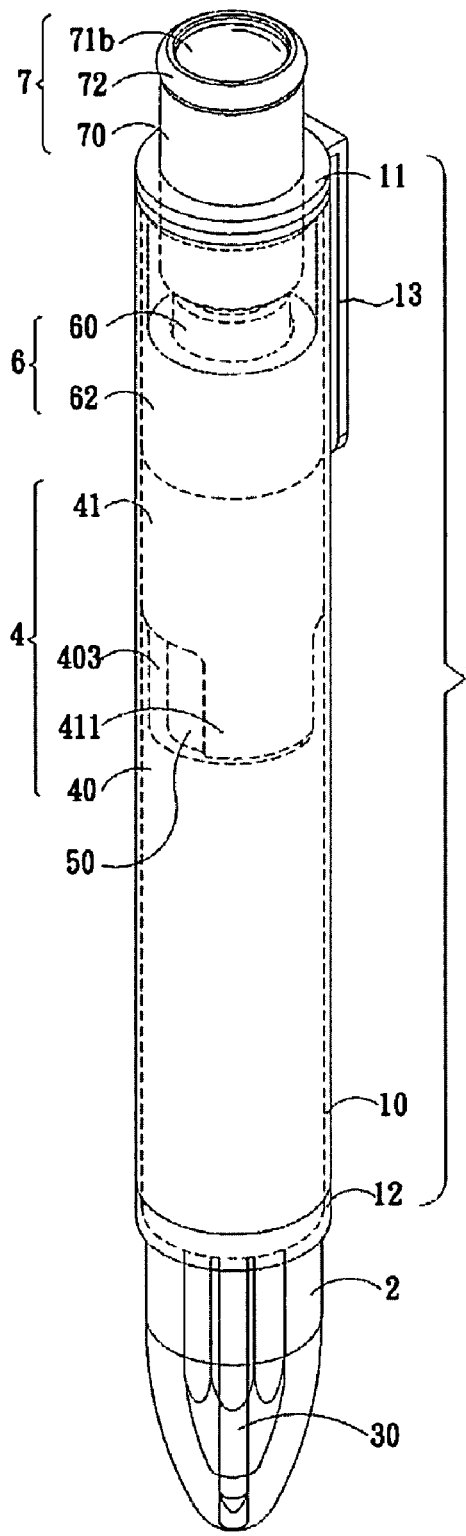
FIG. 3 is a schematic view of the luminous pen according to the invention.

In FIGS. 1 & 2, the rotation restricting stop 41 secured inside the shaft 1 has lengthwise slips 412 bulged inward along an inner wall of the rotation restricting stop 41. While an outer wall of the first base 50 is formed with lengthwise slots 501 corresponding to the slips 412. The slips 412 press-fit into the slots 501 results in the first base 50 is coupled with the rotation restricting stop 41 without any rotations. Further, a distal end of the sleeve 40 is chipped or indented to form a groove or indent 403, while a jut 411 projected downward is hung from a proximal end of the rotation restricting stop 41. The jut 411 corresponds to the chipped groove or indent 403. As shown in FIG. 3, a width of the jut 411 is narrower than a width of the groove or indent 403. Thereby, when the rotation restricting stop 41 coupled to the sleeve 40 is approximately kept constant without movements, the sleeve 40 can be rotated counterclockwise or clockwise at a small pitch and roll angle, till a side wall of the groove or indent 403 resists against the jut 411, the sleeve stops rotating in continuation to the prior rotated direction. Thereby, the sleeve 40 could only be rotated with a pitch and roll angle limited by the jut 411 conformed to the groove or indent 403 in proportion to the full circle.

The control portion 6 is composed of a guider 62 fit over the rotation restricting stop 41, a first tube joint 60 concentrically fits in the guider 62 is equipped with holding pawls projected downward and fit around a lower rim of the first tube joint 60, a second tube joint 61 disposed below the first tube joint 60 is also equipped with pawls, which are concaved upward corresponding to the holding pawls of the first tube joint, fit around a lower rim. When the first tube joint 60 is lowered to fit over the second tube joint 61, the holding pawls of the first tube joint are joining to the pawls of the second tube joint 61 together along a zigzag path with a pitch and roll angle; thereby, the second tube joint 61 is rotated in a fixed direction in response to a pressure exerted by the holding pawls of the first tube joint 60. However, when the first tube joint 60 is elevated, the holding pawls are separated from the pawls at a gap. At least a conductor 611 is disposed below the second tube joint 61. (only one conductor is illustrated in FIG. 2) A width of the conductor 611 is narrower than the slots equidistantly arranged on the upper surface at the distal end of the first base 50; namely, the gap between the slot 505 and the slot 507 identical to the gap between the slot 506 and the slot 508 are larger than the width of the conductor 611. As a result, the conductor 611 spans across from the distal end 551a of the first leg 551 of the first LED 55a to the distal end 503a of the first lead 503, or from the distal end 552a of the second leg 552 of the first LED 55a to the distal end 504a of the second lead 504. Since the guider 62 can be formed together with the rotation restricting stop 41 integrally as a whole by injection molding in one step, labor cost and material cost can be saved.

Figure 4:
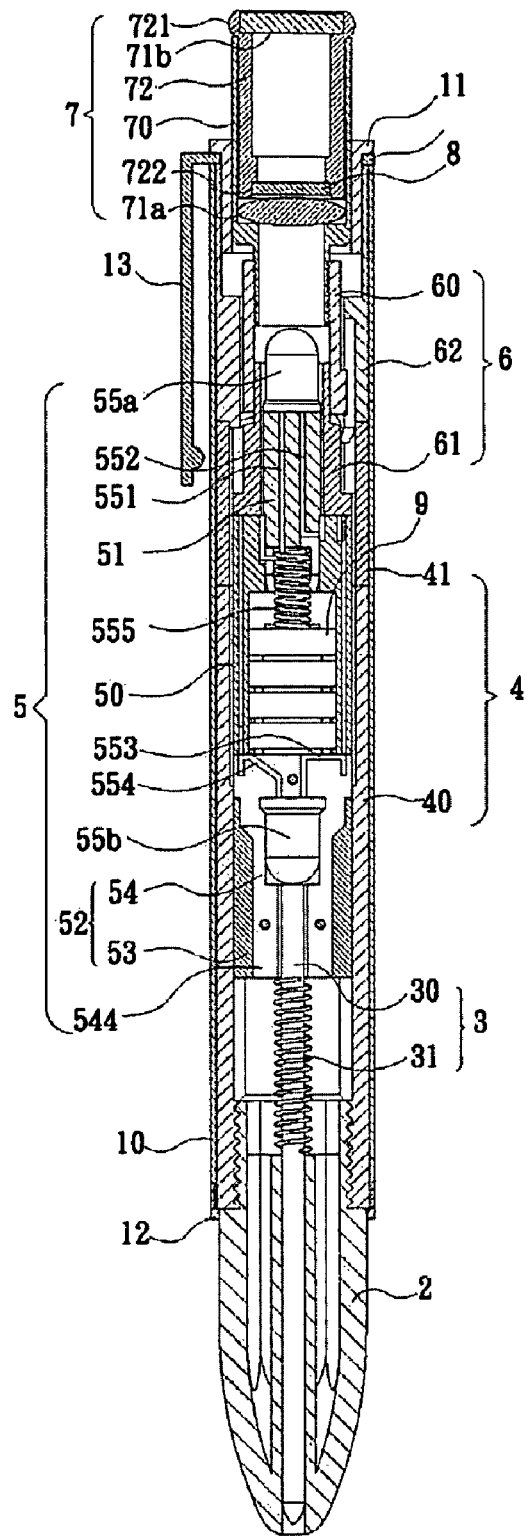
FIG. 4 is a sectional view of the luminous pen according to the invention.
Figure 15:
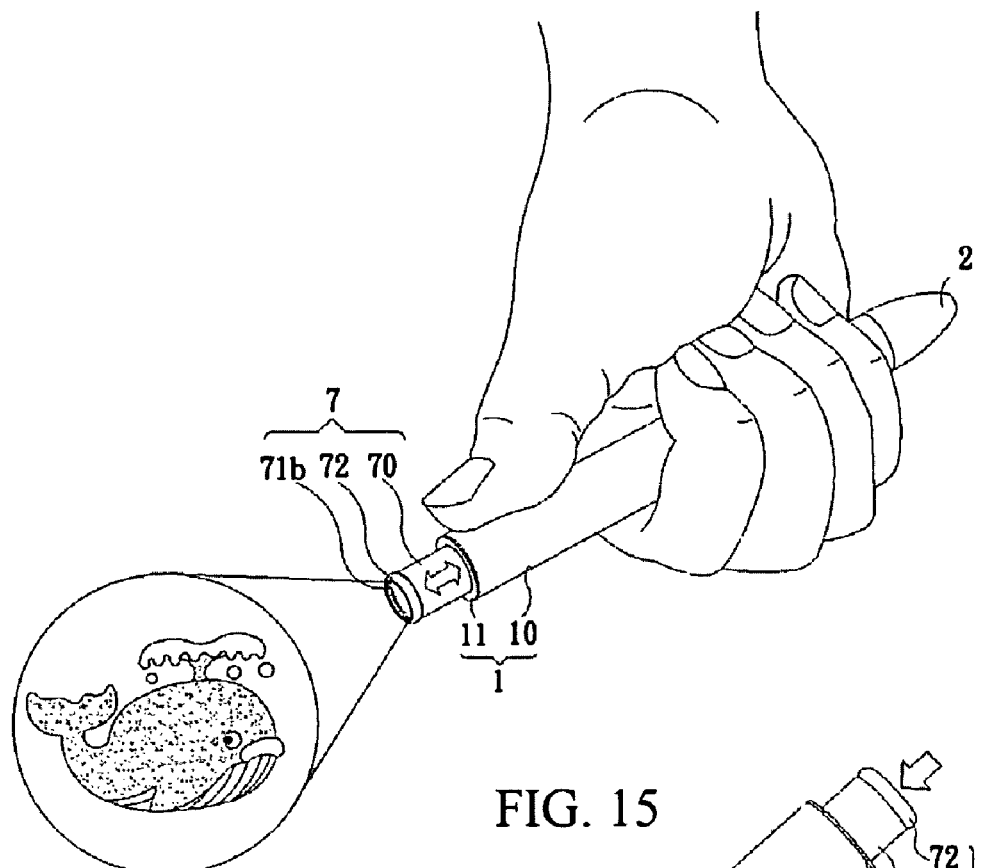
FIGS. 15~16 are schematic views of two embodiments of the luminous pen when the button is pressed according to the present invention.

As shown in FIGS. 1 and 4, said button 7 is only used as a projector; the button 7 must be configured as a hollow tube, which is provided with a base 70 at a proximal end, the base 70 is in line with the control portion 6, but disposed above the control portion, in practice, the base 70 is substantially screwed to the first tube joint 60. A distal end of the button 7 holds a single lens 71b or a set of dual lens 71a and 71b. As a result, the first LED 55a can emit light through the button and lens to illuminate surrounding environment. However, the button 7 of the present invention is designed as a projector, the button 7 is configured by the base 70, which is hollowed out, is in line with the first tube joint 60 and joined to the first tube joint 60 integrally. A first lens 71a disposed inside the base 70, a hollow journal 72 is also disposed inside the base 70, but the hollow journal 72 is further disposed above the first lens 71a. A second lens 71b is further disposed above the hollow journal 72. As shown in FIG. 4, said hollow journal 72 has a slide trough 722 formed at a proximal end for setting a slide 8 in position for projecting purpose; while a distal end of the hollow journal 72 has a lens trough 721 for setting the second lens 71b. When the first LED 55a emits light through the slide 8 and dual lens 71a and 71b, patterns on the slide 8 can be enlarged projected to surrounding objects lit by the first LED 55a with an interesting and amusing effect that is depicted in FIG. 15.

Figure 5:
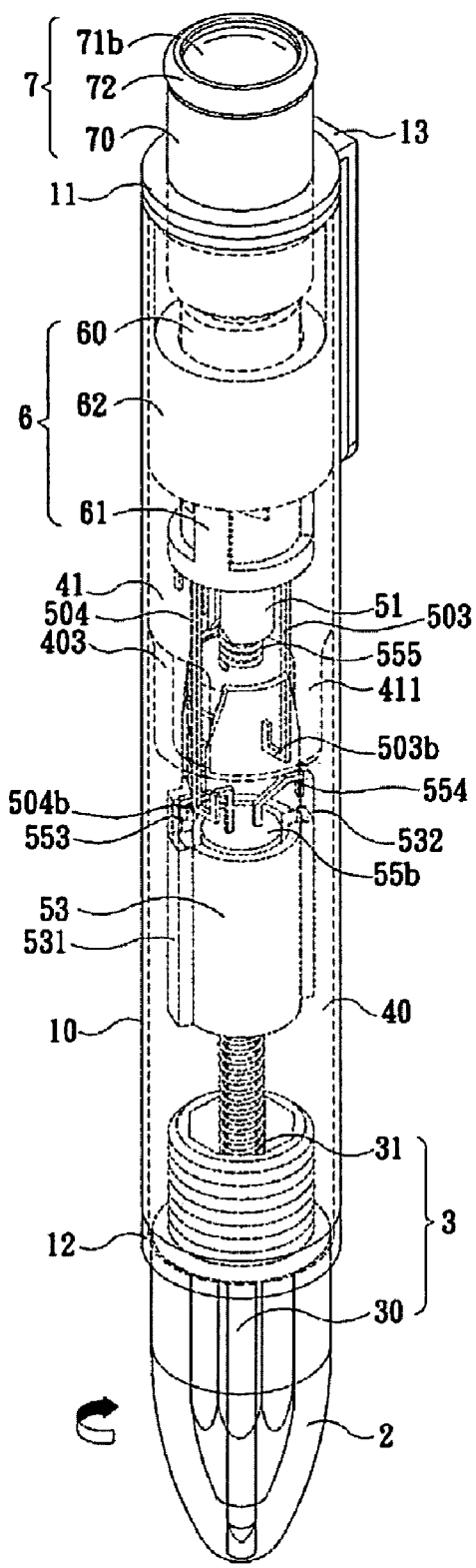
FIG. 5 is a schematic view of a tapered transparent tip portion being rotated clockwise according to the present invention.
Figure 7:
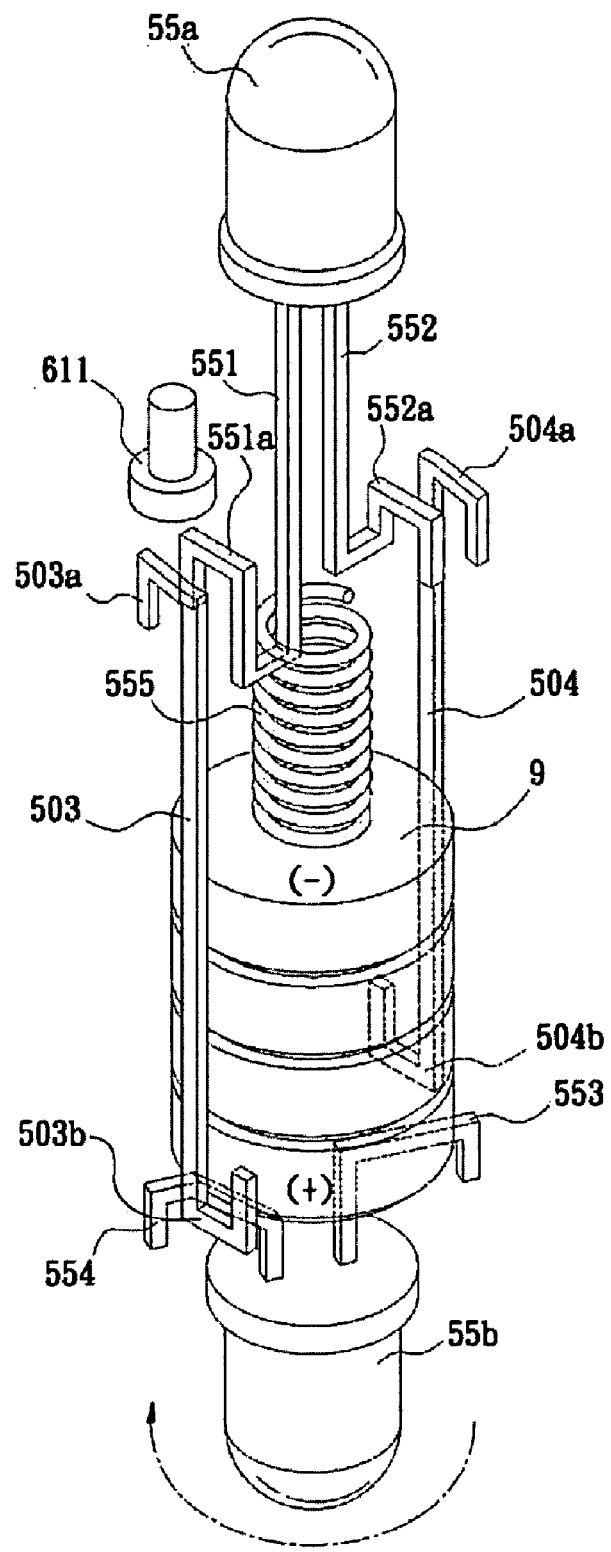
FIG. 7 is a schematic view of the lamp being turned off when the tip portion is rotated clockwise as shown in FIG. 5.

As shown in FIG. 5, the tapered transparent tip portion 2 can be rotated in clockwise direction; at the same time, the sleeve 40 is rotated with the tip portion 2. Further, the conduit bushing 53 coupled to the sleeve 40, and the hub 54 coupled to the conduit bushing 53 are rotated in clockwise direction. As shown in FIG. 7, when the hub 54 is rotated in clockwise direction, a distal end of the first leg 553 of the second LED 55b is separated from the proximal end 504b of the second lead 504 of the first base 50. In the same token, the second leg 554 of the second LED 55b is separated from the proximal end 503b of the first lead 503 of the first base 50. Thus, positive charges flow from a proximal end of the cell 9 is not supplied to the first LED 55a by the second lead 504. While negative charges flow from a distal end of the cell 9 is not supplied to the second LED 55b by the first lead 503. No matter how users press the button 7, the LEDs 55a and 55b are dim. Thus the button 7 can be avoided from unintentional manual operation to light up either the first LED 55a or the second LED 55b to consume power.

Figure 6:
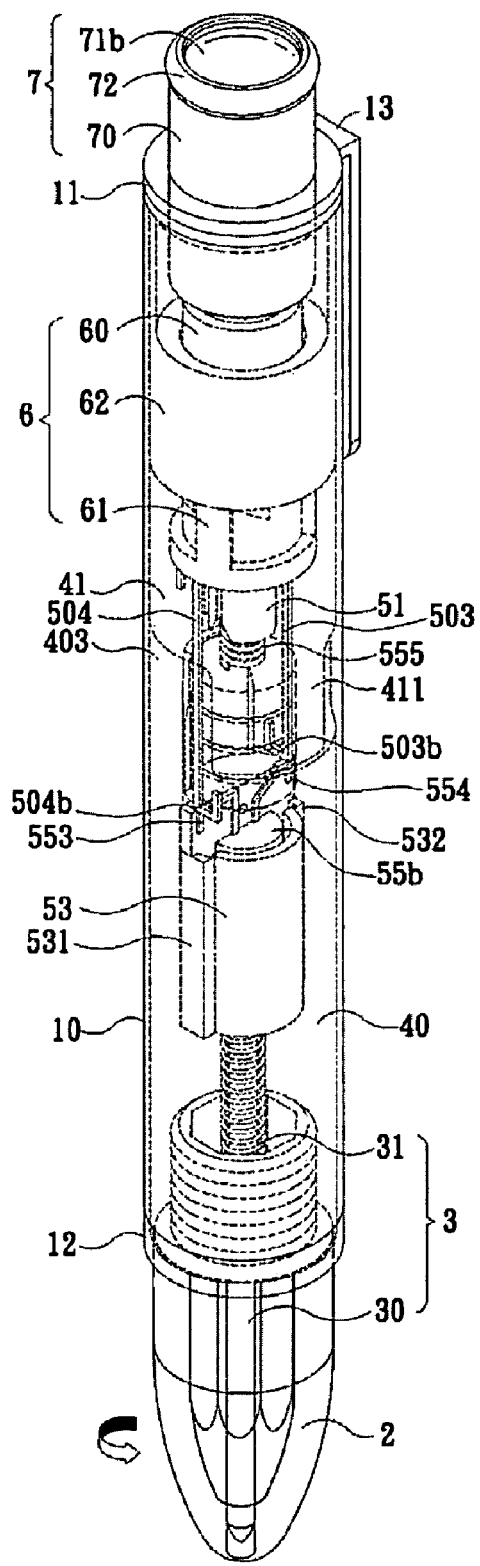
FIG. 6 is a schematic view of a tapered transparent tip portion being rotated counterclockwise according to the present invention.
Figure 8:
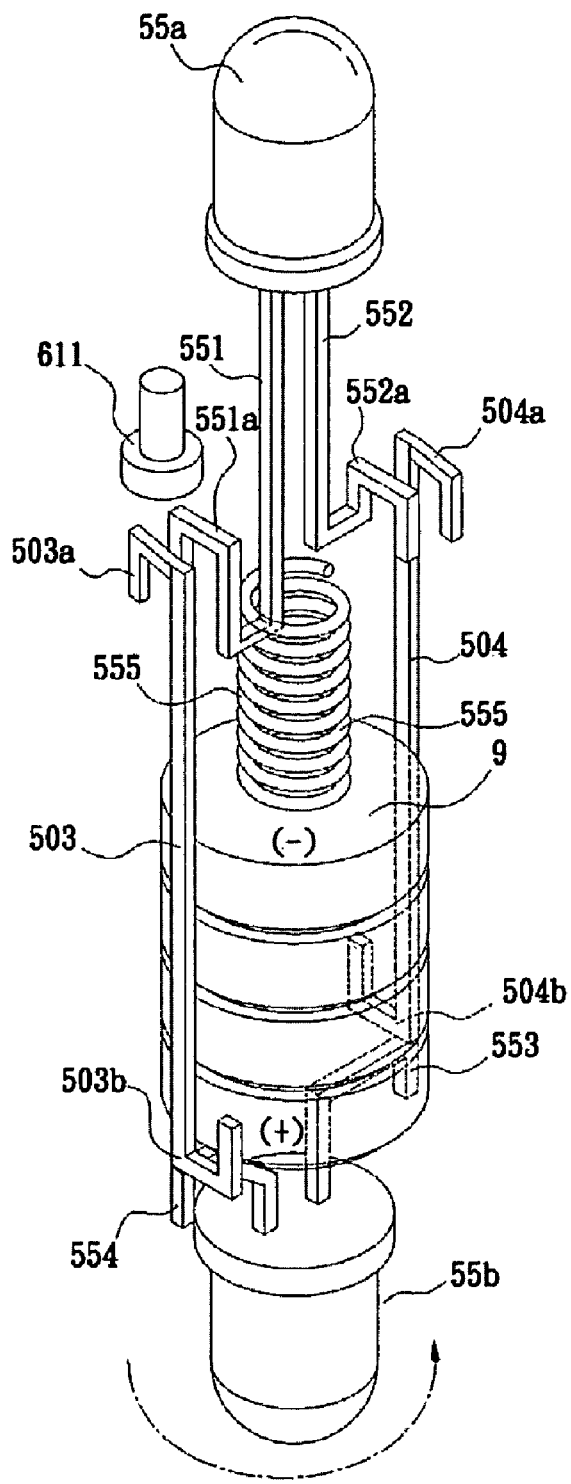
FIG. 8 is a schematic view of the lamp being turned on when the tip portion is rotated counterclockwise as shown in FIG. 6.

As shown in FIG. 6, the tapered transparent tip portion 2 can be rotated in counterclockwise direction. At the same time, the sleeve 40 is rotated with the tip portion 2. Further, the conduit bushing 53 coupled to the sleeve 40, and the hub 54 coupled to the conduit bushing 53 are rotated in counterclockwise direction. As shown in FIG. 8, when the hub 54 is rotated in counterclockwise direction, the first leg 553 of the second LED 55b is joined to the proximal end 504b of the second lead 504 of the first base 50, in other words, they are electrically in one (negative charges) direction connected to the cell (9) prepared for a power supply. In the same token, the second leg 554 of the second LED 55b is joined to the proximal end 503b of the first lead (503) of the first base 50, in other words, they are electrically in another (positive charges) direction connected to the cell 9 prepared for a power supply. Therefore, positive charges flow from the proximal end of the cell (9) is supplied through the first leg 553 of the second LED 55b to the second lead 504, since the distal end 552a of the second leg of the first LED 55a is still not in contact with the distal end 504a of the second lead; positive charges does not flow to the first LED 55a. Further, the second leg (554) of the second LED 55b is in contact with the proximal end of the first lead (503), but the distal end 551a of the first leg of the first LED 55a is not in contact with the distal end 503a of the first lead 503 negative charges does not flow to the second LED 55b. However, the lamp 5 is illuminated under condition of flow of positive charges in another direction together with flow of negative charges in one direction put back to either the first LED 55a or the second LED 55b at the same time. When the button 7 is pressed to change rotation directions of the control portion 6, displacement of the conductor 611 can make either the first LED 55a or the second LED 55b to be illuminated. More details are introduced according to the drawings as below.

Figure 9:
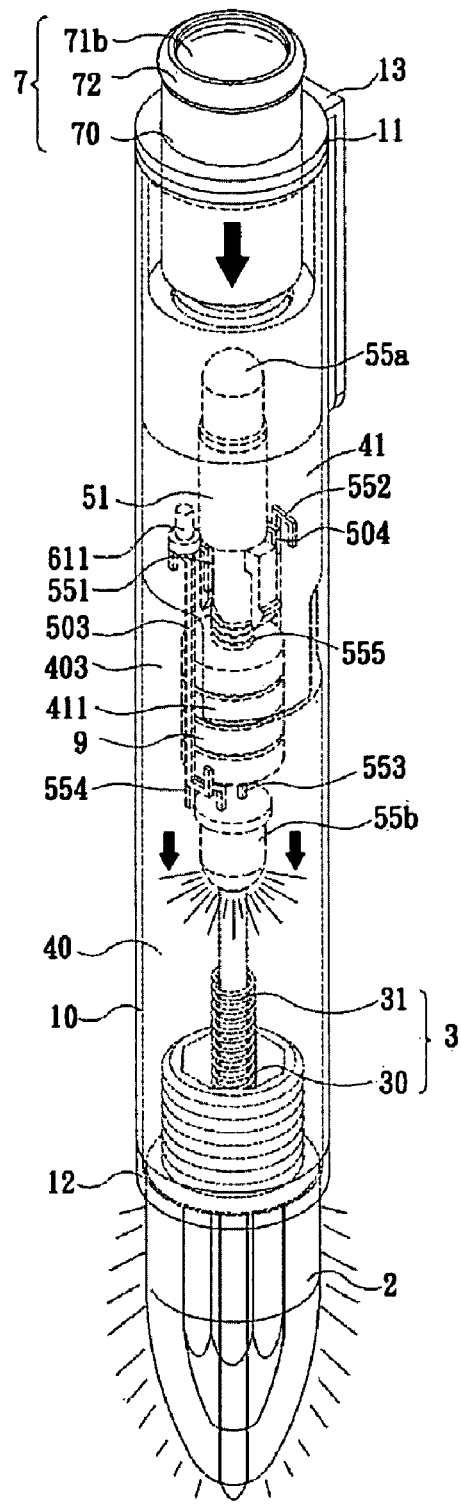
FIG. 9 is a schematic view of the second LED being turned on when the button is pressed according to the present invention.
Figure 11:
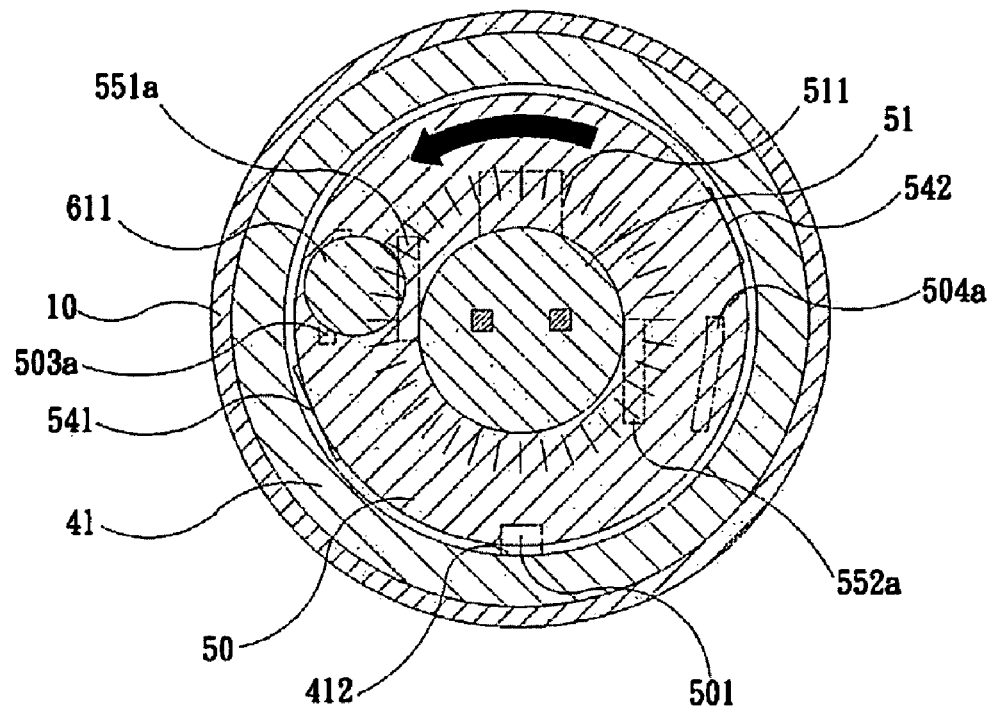
FIG. 11 is a sectional view of the conductor of FIG. 9 connected to the first leg of the first LED, and the first lead of the first base according to the present invention.

As shown in FIG. 9, after the button 7 is being pressed downward, upon ascending or descending pitches of the first tube joint 60 inside the guider 62, the second tube joint 61 rolls left or right due to the holding pawls or pawls on their lower rims are joined together or separated from each other at a gap. As shown in FIG. 11, when the second tube joint 61 is rotated, the conductor 611 disposed below the second tube joint 61 is in contact with the distal end 551a of the first leg of the first LED 55a and disposed above the distal end 503a of the first lead of the first base 50. Electrification applied to the conductor 611 as a medium between the first lead 503 and the first leg 551. As shown in FIG. 13, negative charges flow from the distal end of the cell 9 through the spring force conductor 555, the first leg 551 of the first LED, the conductor 611, and the first lead 503 of the first base to the second leg 554 of the second LED 55b. Since the proximal end of the cell 9 is always in contact with the first leg 553 of the second LED 55b to supply positive charges to the second LED 55b. Both positive and negative charges supply to the second LED 55b, which is electrified to be illuminated immediately. LED 55b emits light through the tapered transparent tip portion 2 to, for example, paper on desktop to facilitate writing at night.

Figure 10:
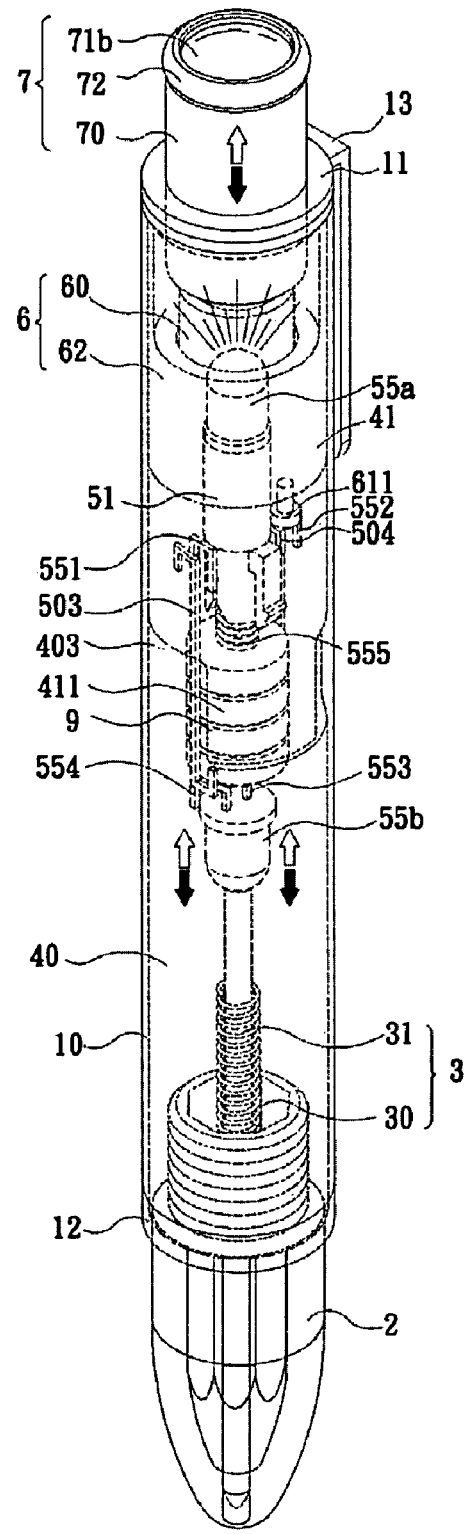
FIG. 10 is a schematic view of the first LED being turned on when the button is pressed according to the present invention.
Figure 12:
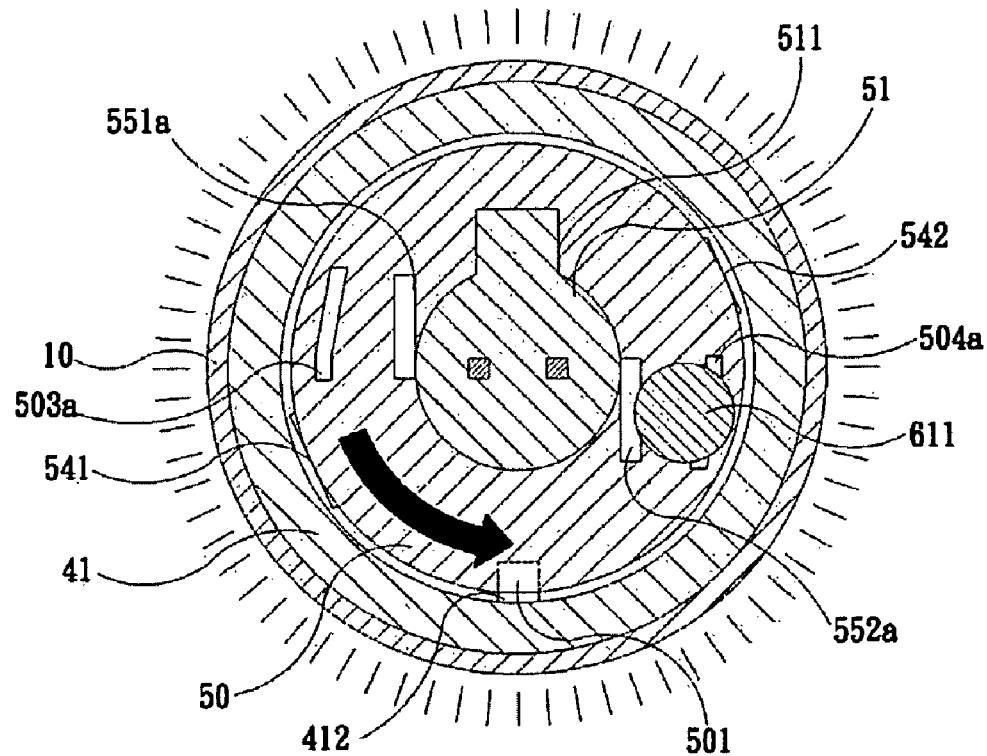
FIG. 12 is a sectional view of the conductor of FIG. 10 connected to the second leg of the first LED, and the second lead of the first base according to the present invention.

As shown in FIG. 10, when the user presses the button 7 once more, the second tube joint 61 disposed to a lower portion of the control portion 6 is rotated again. As shown in FIG. 12, the conductor 611 disposed below the second tube joint 61 is in contact with the distal end 552a of the second leg of the first LED 55a and disposed above the distal end 504a of the second lead of the first base 50. The conductor 611 is therefore introduced in between, and spanned across from the distal end 552a of the second leg to the distal end 504a of the second lead. As shown in FIG. 14, positive charges flow from the proximal end of the cell 9 through the first leg 553, the second lead 504 of the first base, and the conductor 611 to the second leg 552 of the first LED 55a. But negative charges flow from the spring force conductor 555 to the first leg 551 of the first LED 55a. Thereby, positive and negative charges supply to the first LED 55a, which is electrified to be illuminated. The first LED 55a emits light upward through the hollow button 7 with visible light emission illuminates surrounding environment at night.

Figure 16:
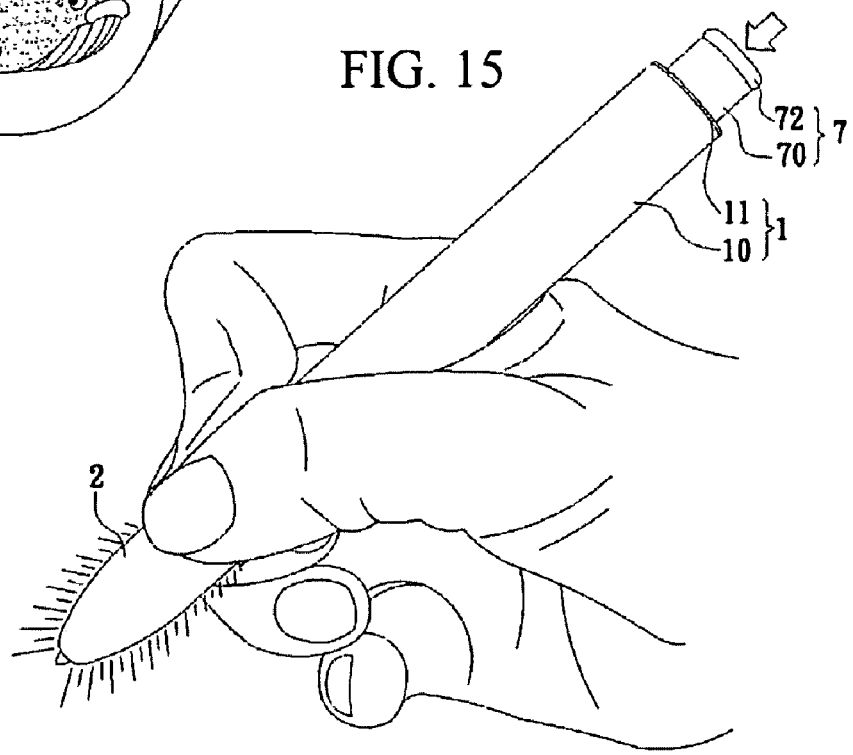

As shown in FIGS. 15, 16, the button 7 may be pressed to display patterns or for illumination depicted as two embodiments. In FIG. 15, the first LED 55a inside the luminous pen emits light through the slide 8 to put a lit pattern printed on the slide 8 to a surface of surrounding objects. Since the first lens 71a is designed as an optical condenser, while the second lens 71b is a magnifying glass, thereby the lit patterns put on surrounding objects can be magnified in proportional to a distance between the magnifying lens and the object relative to a distance between the magnifying lens and the slide. An interesting and advertising effect can be achieved.

As shown in FIG. 16, the second LED 55b inside the luminous pen is electrified to be illuminated. The second LED 55b emits light which passes through the tapered transparent tip portion 2 to the paper to facilitate writing in the dark.

As described above, the button 7 is pressed to turn on either the first LED 55a or the second LED 55b. Thereby, when the button 7 is pressed two times, both LEDs can be lit one time separately, which is more convenient for users than the conventional luminous pen which requires pressing the button six times to turn on each of LEDs only one time.

Figure 17:
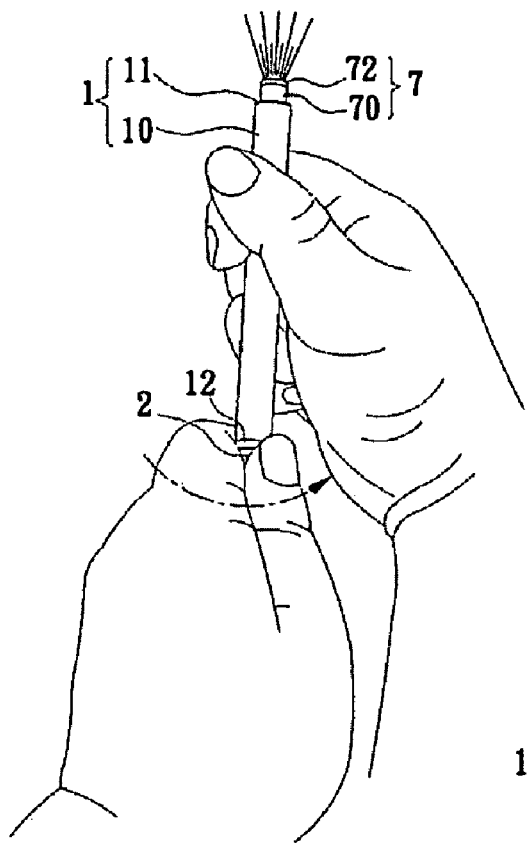
FIGS. 17~18 are schematic views of the tip portion rotated by hand according to the present invention.
Figure 18:
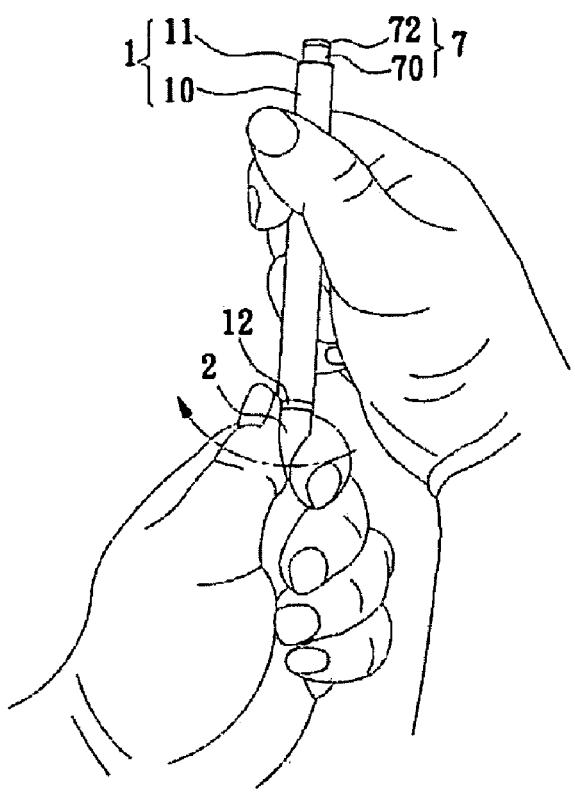

As shown in FIG. 17~18, the tapered transparent tip portion 2 can be rotated by hand. As shown in FIG. 17, the transparent tip portion 2 can be rotated in counterclockwise direction, where the lamp 5 inside the luminous pen is turned on. When the button 7 is pressed, the first LED 55a (or the second LED 55b) is illuminated, the LED 55a emits light which passes through the lens 71a and 71b to surrounding environment for the purpose of providing illumination.

As shown in FIG. 18, the tapered transparent tip portion 2 can be rotated in clockwise direction; the lamp 5 inside the luminous pen is turned to an electrical insulation status. Even when the button 7 is pressed, the first and second LEDs 55a and 55b will not be electrified to be illuminated. Thus the luminous pen can be safely put away.

While this invention has been particularly shown and described with references to preferred embodiments thereof, it will be understood by those skilled in the art that various changes in form and details may be made therein without departing from the scope of the invention encompassed by the appended claims.

What is claimed is:

1. A dual mode luminous ball pen comprising:
   a pen shaft;
   a transparent tip portion disposed on a proximal end of the pen shaft, wherein the tip portion is rotatably operated;
   a refill operated with a nib being advanced forward through the tip portion to retain a writing position;
   a switch portion disposed inside the pen shaft and connected to the tip portion for rotating a sleeve;
   a lamp comprising at least a cell, a first light emitting diode (LED), and a second light emitting diode (LED), being rotated together by the sleeve to supply/cut-off a power supplied by the cell to the LEDs;
   a control portion disposed on the switch portion to turn on one of the first and second LEDs; and
   a button depressed into the pen shaft to rotate the control portion.

2. The dual mode luminous ball pen of claim 1, wherein said sleeve is coupled to the tip portion, a rotation restricting stop is employed to restrict a pitch and roll angle of the sleeve; the first LED is disposed on a first base of the lamp, and the second LED is disposed on a second base of the lamp.

3. The dual mode luminous ball pen of claim 2, wherein said rotation restricting stop is coupled to the first base of the lamp; a first lead and a second lead are disposed on both sides of the first base of the lamp respectively; and first legs of the first and second LEDs are connected to an anode and a cathode of the cell respectively.

4. The dual mode luminous ball pen of claim 3, wherein a conductor is disposed below the control portion; wherein when the control portion is rotated at a pitch and roll angle, the conductor is spanned across from a distal end of the first lead to the first leg of the first LED or from a distal ends of the second lead to the second leg of the first LED, and one of the LEDs can be activated to light up separately.

5. The dual mode luminous ball pen of claim 4, wherein said control portion is composed of a guider disposed on an upper portion of the switch portion, a first tube joint concentrically fitted in the guider is disposed between the button and a second tube joint; said first tube joint is fitted over said tube joint by holding pawls of the first tube joint joined together with pawls of the second tube joint with a pitch and a roll angle; and at least said conductor is disposed below the second tube joint.

6. The dual mode luminous ball pen of claim 5, wherein the guider and the rotation restricting stop are integrally formed by an injection molding process.

7. The dual mode luminous ball pen of claim 3, wherein said first and second leads are led into both sides of the first base, distal ends of both leads are parallel to the first and second legs of the first LED, and both leads are not electrically connected to the first and second legs; and proximal ends of both leads can be operated to adjoin to the first and second legs of the second LED or the proximal ends can be operated to separate from the first and second legs.

8. The dual mode luminous ball pen of claim 2, wherein said rotation restricting stop comprises slips bulging inward from an inner wall, while the first base comprises slots formed on an outer wall thereof; the slips correspond to the slots, and the rotation restricting stop is coupled to the first base.

9. The dual mode luminous ball pen of claim 2 wherein said sleeve comprises a chipped groove formed on a distal end thereof, while the rotation restricting stop comprises a jut corresponding to the chipped groove to limit a pitch and roll angle of the sleeve rotation.

10. The dual mode luminous ball pen of claim 2, wherein an inner wall of the sleeve is lengthwise symmetrically formed with a first slot, and a second slot opposite to each other; said conduit bushing is concentrically disposed inside the sleeve, and both sides on an outer wall of the conduit bushing is lengthwise bulged out with a first slip and a second slip relative to the slots and fit in the slots.

11. The dual mode luminous ball pen of claim 2, wherein a tappet disposed on top of the first base with an elastic hook is hung from a proximal end thereof; the elastic hook press-fits through an upper surface of the first base and sticks out from an opening formed on a wall of the first base with a curved tip of the elastic hook; a first leg and a second leg of the first LED extend through the tappet downward, and a distal end of the first leg spanned across by a spring force conductor is able to contact with a cathode of the cell.

12. The dual mode luminous ball pen of claim 11, wherein the upper-half portion is formed with a cavity of a diameter larger than the lower-half portion for receiving the cell to form a holder; and the lower-half portion is concaved downward with diameter smaller than the upper-half portion for receiving the second LED and set of refills to form a beam pipe to press-fit in the rotation restricting stop.

13. The dual mode luminous ball pen of claim 2, wherein said hub comprises two shells symmetrically opposite to each other, each of the shell is divided into an upper-half portion and a lower-half portion.

14. The dual mode luminous ball pen of claim 13, wherein edges of upper rim of a beam pipe are symmetrically bulged out from two slides opposite to each other; and both slidingly press-fit in slots lengthwise formed inside a top rim of the rotation restricting stop in position; and wherein as the sleeve is rotated, the conduit bushing and the hub are rotated simultaneously.

15. The dual mode luminous ball pen of claim 1, wherein the second base of the lamp comprises a conduit bushing coupled to the sleeve, a hub is fit in the conduit bushing by a lower-half portion, while an upper-half portion of the hub comprises the cell mounted therein is fit in the first base of the lamp; and the lower-half portion of the hub comprises the second LED mounted therein.

16. The dual mode luminous ball pen of claim 1, wherein said button is composed of a hollow base and is disposed over and aligned with the control portion; wherein a first lens and a hollow journal and a second lens is disposed above the hollow journal; said hollow journal comprises a slide trough formed at a proximal end for setting a slide in position for projecting purpose; and a distal end of the hollow journal comprises a lens trough for setting the second lens.

* * * * *